US007151988B2

(12) United States Patent
Sasaki et al.

(10) Patent No.: US 7,151,988 B2
(45) Date of Patent: Dec. 19, 2006

(54) VEHICULAR NEUTRALIZING APPARATUS

(75) Inventors: Michiaki Sasaki, Hadano (JP); Hiroaki Himeki, Fujisawa (JP); Takayuki Fuwa, Tokyo (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 56 days.

(21) Appl. No.: 10/759,132

(22) Filed: Jan. 20, 2004

(65) Prior Publication Data

US 2004/0167679 A1 Aug. 26, 2004

(30) Foreign Application Priority Data

Feb. 25, 2003 (JP) .......................... P2003-047463

(51) Int. Cl.
*H01T 23/00* (2006.01)
*B60R 16/06* (2006.01)

(52) U.S. Cl. ........................................ 701/36; 361/216

(58) Field of Classification Search .................... 701/1, 701/36; 361/216, 212
See application file for complete search history.

(56) References Cited

U.S. PATENT DOCUMENTS 5,095,400 A * 3/1992 Saito .......................... 361/220

FOREIGN PATENT DOCUMENTS

| | | | |
|---|---|---|---|
| DE | 42 17 199 | A1 | 11/1993 |
| EP | 0 380 037 | A3 | 8/1980 |
| EP | 0 274 384 | A1 | 7/1988 |
| JP | 01-305967 | A | 12/1989 |
| JP | P2002-178859 | A | 6/2002 |

* cited by examiner

*Primary Examiner*—Michael J. Zanelli
(74) *Attorney, Agent, or Firm*—McDermott Will & Emery LLP

(57) ABSTRACT

A vehicular neutralization apparatus is provided with an ion generator disposed on at least one of a roof of a vehicle and an area in a vicinity of the roof inside the vehicle to allow ions, generated with the ion generator, to be oriented toward an occupant, in such a manner that static electricity charged to the occupant is neutralized.

13 Claims, 7 Drawing Sheets

VEHICULAR NEUTRALIZING APPARATUS

BACKGROUND OF THE INVENTION

The present invention relates to a vehicular neutralizing apparatus and, more particularly, to a vehicular neutralizing apparatus for neutralizing static electricity charged in a vehicle or an occupant.

As a dry condition with a low humidity continues, static electricity is liable to be charged in a charging body, such as an occupant or a vehicle, causing various troubles to occur due to static electricity. If a back of the occupant is rubbed against a seat during drive of the vehicle, a human body, clothes and shoes are charged with static electricity due to friction. Further, when attempting to travel the vehicle under fine weather, the vehicle is charged with static electricity due to friction between tires and the ground and friction between a vehicle body and air. Under such a state, if the occupant touches a door knob of the vehicle, the charged static electricity is discharged, resulting in occurrence of discomfort feeling.

Japanese Patent Application Laid-Open Publication No. 2002-178859 discloses a neutralizing apparatus. According to such a disclosure, in FIG. 1 and related description, as a countermeasure to alleviate the discomfort feeling of the occupant, a proposal has been made to provide a structure wherein a vehicle is installed with an ion generator for generating ions to permit the ion generator to release the ions toward an occupant when the occupant operates a door lock button or a door knob sensor for thereby neutralizing the static electricity charged in the occupant.

SUMMARY OF THE INVENTION

However, upon careful studies undertaken by the present inventors, with such a structure, since no consideration is substantially undertaken for the structure per se or additionally for a motional posture of the occupant getting on and off the vehicle, the ion generator has no choice but to be disposed in a relatively low position such as a vicinity of the door knob or a vicinity of an insertion port of an ignition key, resulting in a tendency of an inability of efficiently performing neutralization. That is, if the ion generator is merely placed in the relatively low area, the ions generating from the ion generator is hard to adequately impinge upon a whole (especially the shoulder or the arms) of the human body of the occupant and it is conceivable that it takes an extended period of time for neutralizing charged particles or inadequate neutralizing result is caused, deteriorating a neutralizing efficiency.

Therefore, the present invention has been completed upon such studies conducted by the present inventors and has an object to provide a vehicular neutralizing apparatus that is able to efficiently neutralize static electricity charged in an occupant.

To overcome the above object, in one aspect according to the present invention, a vehicular neutralization apparatus comprises: an ion generator disposed on at least one of a roof of a vehicle and an area in a vicinity of the roof inside the vehicle to allow ions, generated with the ion generator, to be oriented toward an occupant, thereby neutralizing static electricity charged to the occupant.

In other words, in another aspect according to the present invention, a vehicular neutralization apparatus comprises: ion generating means, disposed on at least one of a roof of a vehicle and an area in a vicinity of the roof inside the vehicle, for generating ions; and controlling means for controlling the ion generating means to supply the ions, generated by the ion generating means, toward an occupant, thereby neutralizing static electricity charged to the occupant.

Other and further features, advantages, and benefits of the present invention will become more apparent from the following description taken in conjunction with the following drawings.

DETAILED DESCRIPTION OF THE PREFERRED EMBODIMENT

Hereunder, a vehicular neutralization apparatus of an embodiment according to the present invention is described below in detail with reference to the accompanying drawings. Also, throughout the drawings, reference symbol "FR" designates the frontward of a vehicle body, "R" the rightward of the vehicle body, and "UPR" the upward of the vehicle, respectively.

Figure 1:
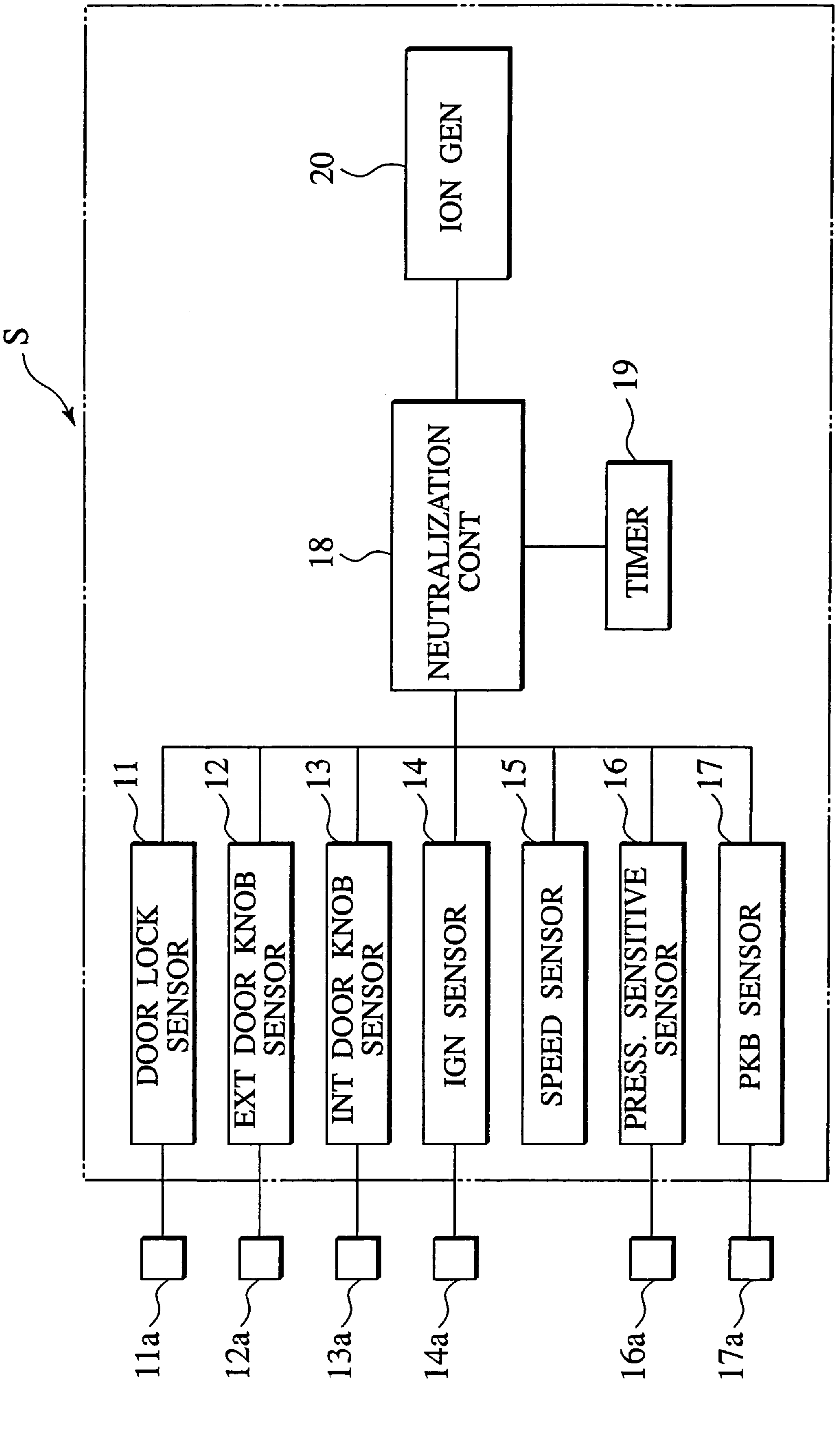
FIG. 1 is a block diagram showing a schematic structure of a vehicular neutralization apparatus of a first embodiment according to the present invention.
Figure 2:
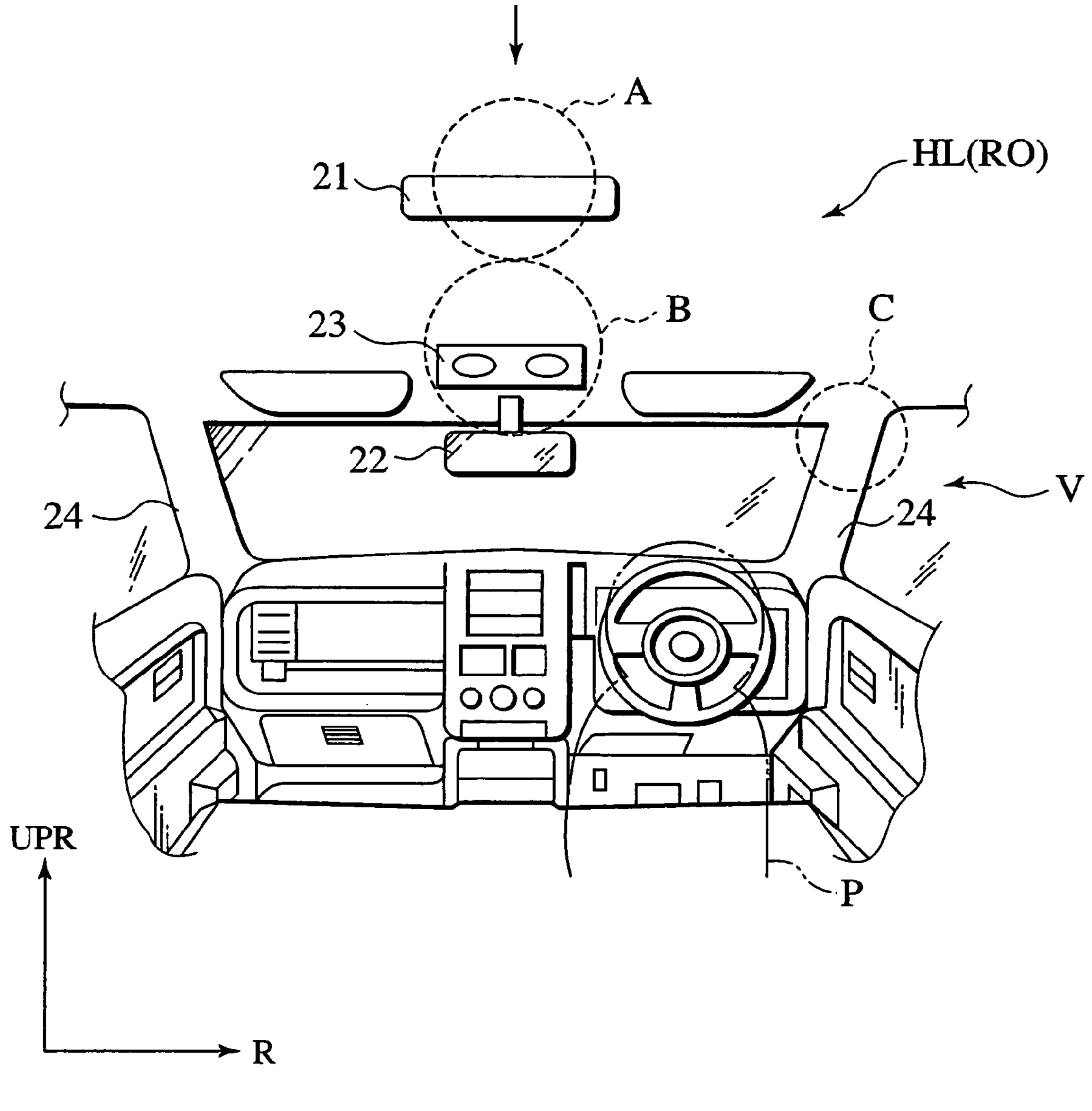
FIG. 2 is a view showing one example of a location of a vehicle to which the ion generator of the vehicular neutralization apparatus is installed, in the first embodiment.
Figure 3:
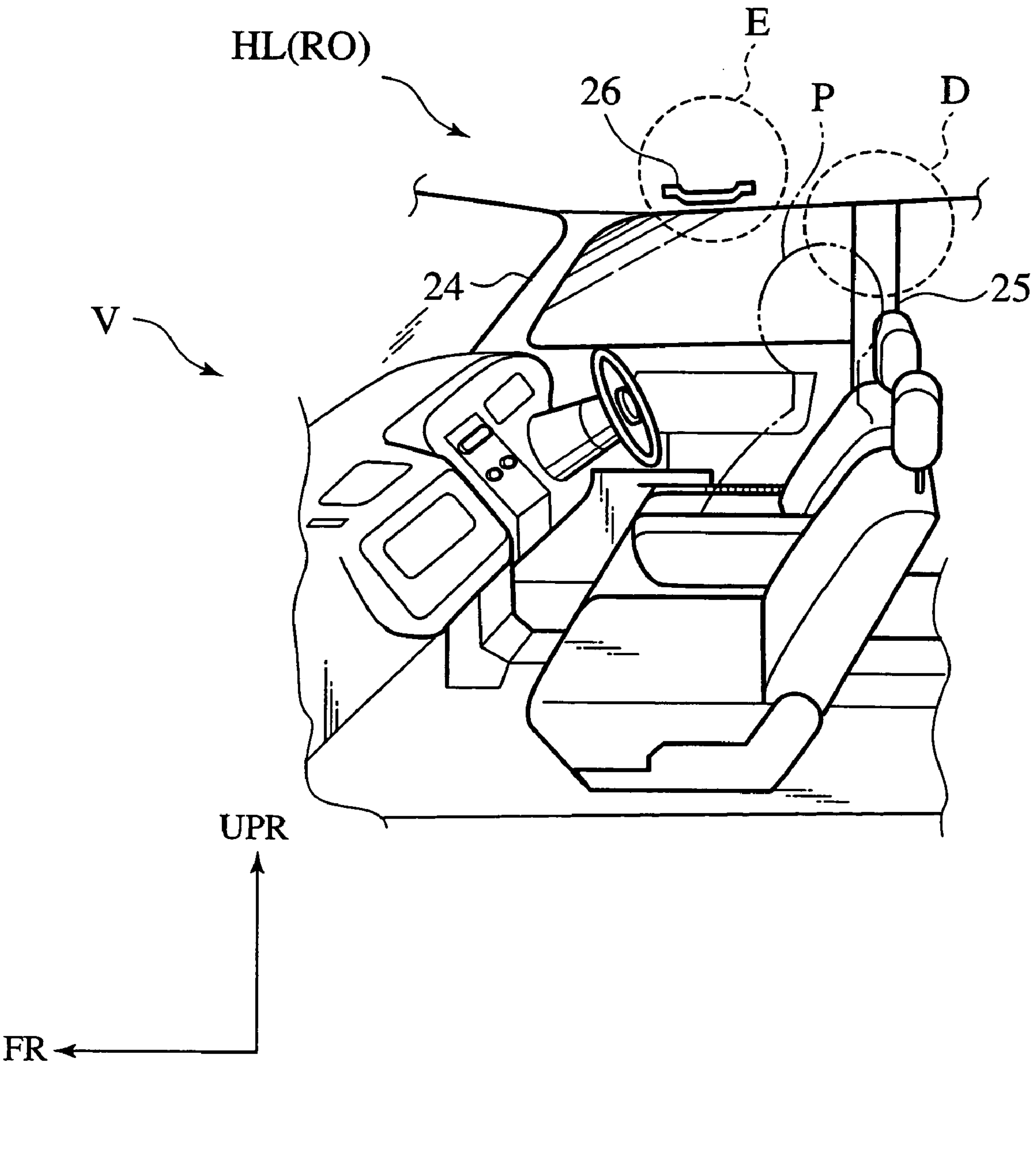
FIG. 3 is a view showing another example of a location of a vehicle to which the ion generator of the vehicular neutralization apparatus is installed, in the first embodiment.

FIG. 1 is a block diagram showing a schematic structure of the vehicular neutralization apparatus of the presently filed embodiment, FIG. 2 is a view showing one example of a location of a vehicle V to which an ion generator of such a vehicular neutralization apparatus is installed, with a vehicle compartment of a vehicle being observed in a forward direction, and FIG. 3 is a view showing another example of a location of the vehicle V to which the ion generator of such a vehicular neutralization apparatus is installed, with the vehicle compartment of the vehicle being observed in a rightward direction.

As shown in FIG. 1, the vehicular neutralization apparatus S is comprised of a door lock sensor 11 that detects whether a door lock button 11*a* inside the vehicle is operated, an external door knob sensor 12 that detects whether an external door knob 12*a* outside the vehicle is operated, an internal door knob sensor 13 that detects whether an internal door knob 13*a* inside the vehicle is operated, an ignition sensor 14 that detects whether an ignition 14_a_ of the vehicle is actuated, a speed sensor 15 that detects a vehicle speed, a pressure sensitive sensor 16 that detects whether an occupant, such as a driver, rests on a seat 16_a_, and a PKB (parking brake) sensor 17 that detect whether a parking brake 17_a_ remains actuated.

Further, a neutralization controller 18 is provided, and the door lock sensor 11, the outside knob sensor 12, the inside knob sensor 13, the ignition sensor 14, the speed sensor 15, the pressure sensitive sensor 16 and the PKB sensor 17 are electrically connected to the neutralization controller 18. Moreover, electrically connected to the neutralization controller 18 are a timer 19 and an ion generator 20.

Incidentally, in a case where the vehicle includes a passenger car, although typical pluralities of door lock sensors 11, external door knob sensors 12, internal door knob sensors 13 and pressure sensitive sensors 16 can be located at positions corresponding to a driver's seat, an assistant driver's seat and left and right rear seats, respectively, only one of the sensors for each position is shown in FIG. 1 for the sake of convenience of description.

On the driver's seat side, as shown in FIG. 2, the ion generators 20 are mounted to a location A in the vicinity of a room lamp 21 mounted to a central area of a ceiling (head lining) HL disposed inside of the vehicle compartment of a roof RO of the vehicle, a location B in the vicinity of a map lamp 23 mounted to the ceiling HL at an area rearward of a back mirror 22 in front of the ceiling HL and forward of the room lamp 21, and a location C inside of and upward of a front pillar 24, respectively. Additionally, as shown in FIG. 3, the ion generators 20 are mounted to a location D inside of and upward of a center pillar 25 and a location E in the vicinity of an assist grip 26, to be gripped by an occupant, that is mounted to the ceiling HL at an area between the front pillar 24 and the center pillar 25, respectively. That is, such locations A to E are positioned in the vicinity of an operation objective to be operated by the occupant P such as the driver and an objective region by which the occupant passes during getting off the vehicle. Namely, such locations A to E are determined in consideration of a motional posture of the occupant, especially, a motional posture of the driver or passenger due to his action or behavior during getting on or getting off the vehicle.

Figure 4:
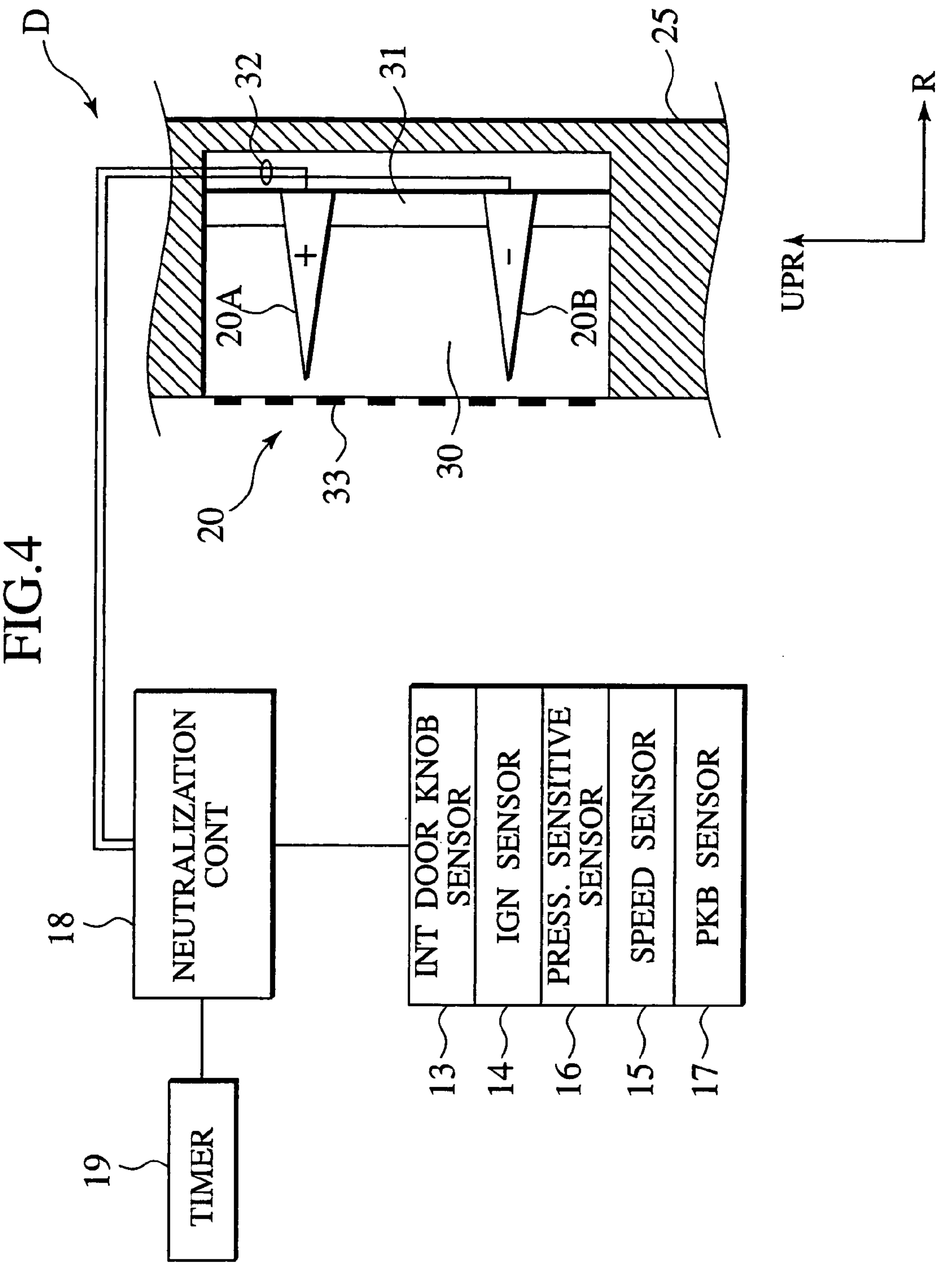
FIG. 4 shows a structural view of the ion generator representatively located inside of and upward of a right center pillar of the vehicle, in the first embodiment.
Figure 5:
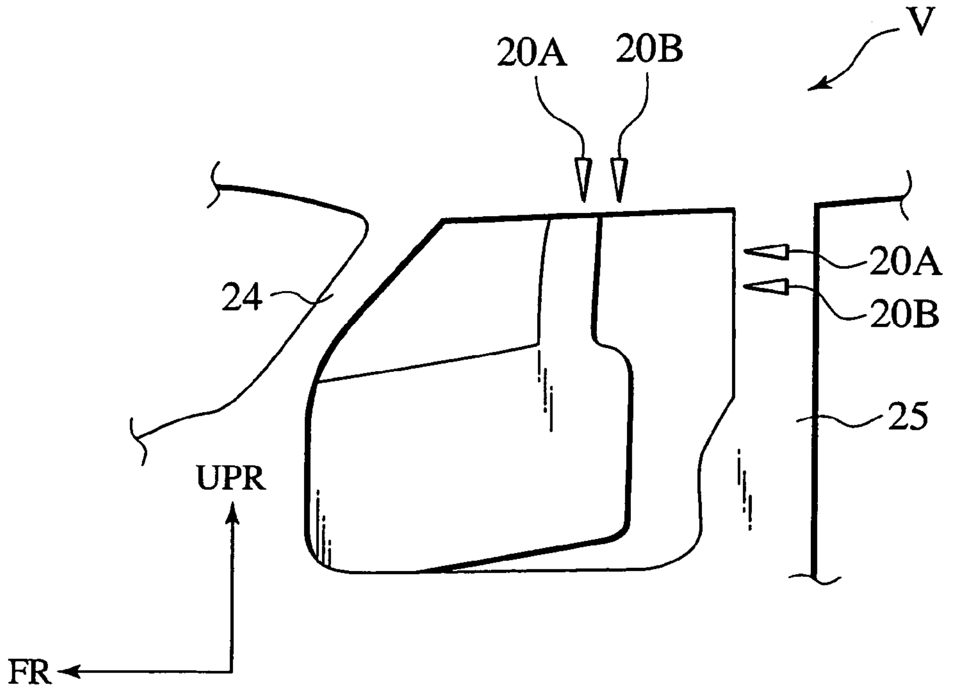
FIG. 5 is a schematic view representatively illustrating orientations of a positive electrode and a negative electrode of the ion generator, in the first embodiment.

FIG. 4 typically shows a structural view of the ion generator 20 located inside of and upward of a right center pillar 25 of the vehicle, and FIG. 5 is a schematic view illustrating orientations of a positive electrode and a negative electrode of the ion generator 20.

Although the ion generator 20 includes a pair of electrodes in general, more particularly, as shown in FIG. 4, the ion generator 20 located inside of and upward of the center pillar 25 is comprised of a pair of a positive electrode 20A that contributes to emit positive ions and a negative electrode 20B that contribute to emit negative ions. Each of the positive electrode 20A and the negative electrode 20B has a sharpened distal end, with the positive electrode 20A and the negative electrode 20B are disposed in opposition to one another.

Formed inward of and upward of the center pillar 25 is a small spatial area 30 in which the cone-shaped positive electrode 20A and negative electrode 20B are accommodated. Disposed in the small spatial area 30 in a vertical direction is a support plate 31 on which base portions of the positive electrode 20A and the negative electrode 20B are fixedly retained. Also, connected to the base portions of the positive electrode 20A and the negative electrode 20B, respectively, are ends of lead wires 32 whose other ends are connected to the neutralization controller 18.

Further, an open end of the spatial area 30, in which the positive electrode 20A and the negative electrode 20B are accommodated, is oriented forward of the vehicle compartment and, so, covered with an electrode protector cover 33, avoiding the distal ends of the positive electrode 20A and the negative electrode 20B from hitting the occupant or an obstacle.

Incidentally, in FIG. 4, although the positive electrode 20A is placed upward and the negative electrode 20B is placed downward, of course, an alternative may be such that the positive electrode 20A is disposed downward and the negative electrode 20B is placed upward. Moreover, the ion generators 20 to be placed in the vicinity A of the room lamp 21, the vicinity B of the map lamp 23, the inside and upper C of the front pillar 24, and the vicinity E of the assist grip 26 have structures typically similar in principle to that of FIG. 4.

The positive electrode 20A and the negative electrode 20B have distal end portions oriented toward the occupant who gets on or gets off the vehicle. That is, as shown in FIG. 5, the positive electrode 20A and the negative electrode 20B mounted in the inside and upper D of the center pillar 25 have the distal end portions oriented forward of the vehicle. Also, with respect to the positive electrode 20A and the negative electrode 20B mounted in the vicinity E of the assist grip 26, the distal end portions of these components are oriented downward. Although not shown, such a situation can be similarly applied to the positive electrodes and the negative electrodes mounted in the vicinity A of the room lamp 21, the vicinity B of the map lamp 23 and the inside and upper C of the front pillar 24, with the distal end portions of these components being oriented toward the occupant who gets on or gets off the vehicle.

Incidentally, in the presently filed embodiment, the door lock sensor 11, the external door knob sensor 12, the internal door knob sensor 13, the ignition sensor 14, the speed sensor 15, the pressure sensitive sensor 16 and the PKB sensor 17 form detection means, and the neutralization controller 18 forms a neutralization control means.

Now, operation of the vehicular neutralization apparatus with the structure set forth above is described below.

Suppose the occupant, such as the driver, charged with positive or negative static electricity due to friction of clothes. In general, if the occupant touches the door knob of the vehicle with an attempt to get off the vehicle under such a charged condition, the charged static electricity discharges, causing the occupant to encounter discomfort feeling.

However, with the vehicular neutralization apparatus of the presently filed embodiment, the occurrence of the occupant attempting to get off the vehicle or the situation of the occupant remaining in the course of getting off the vehicle are detected by the door lock sensor 11, the external door knob sensor 12, the internal door knob sensor 13, the ignition sensor 14, the speed sensor 15, the pressure sensitive sensor 16 and the PKB sensor 17. Of course, it may be arranged such that the occurrence of the occupant attempting to get off the vehicle and the situation of the occupant remaining in the course of getting off the vehicle are detected using one of these sensors or using a suitable combination of these sensors.

For example, when attempting to get off the vehicle, since the occupant unlocks the door knob and consecutively operates the door knob, these operations may be detected by the door lock sensor 11 and the internal door knob sensor 13, respectively.

Further, when attempting to get off the vehicle, since the vehicle comes to halt with the vehicle speed zeroing, the occurrence of such status may be detected by the speed sensor 15 and, further, since the engine is stopped, the occurrence of such status may be detected by the ignition sensor 14.

Furthermore, when attempting to get off the vehicle, since the parking brake is applied, the occurrence of such status may be detected by the PKB sensor 17 and, further, since the occupant leaves from the seat, the occurrence of such status may be detected by the pressure sensitive sensor 16.

In addition, in a case where the occupant does not operate the external door knob while the other person outside the vehicle operates the external door knob to allow the occupant to get off the vehicle, the occurrence of the person outside the vehicle operating the external door knob may be detected by the external door knob sensor 12.

And, suppose that all the sensors are reacted, respective detection signals resulting from the door lock sensor 11, the external door knob sensor 12, the internal door knob sensor 13, the ignition sensor 14, the speed sensor 15, the pressure sensitive sensor 16 and the PKB sensor 17 are applied to the neutralization controller 18, which is responsive to these input signals and controls the ion generators 20 disposed in various parts, thereby causing ion generators 20 to emit and supply ions.

And, such ion generators 20 begin to emit and supply the ions, the timer 19 is activated and the neutralization controller 18 discriminates whether a certain time interval has elapsed after receiving a signal from the timer 19. Then, upon elapse of the certain time interval, the neutralization controller 18 interrupts the ion generators 20 from emitting and supplying the ions.

Figure 6:
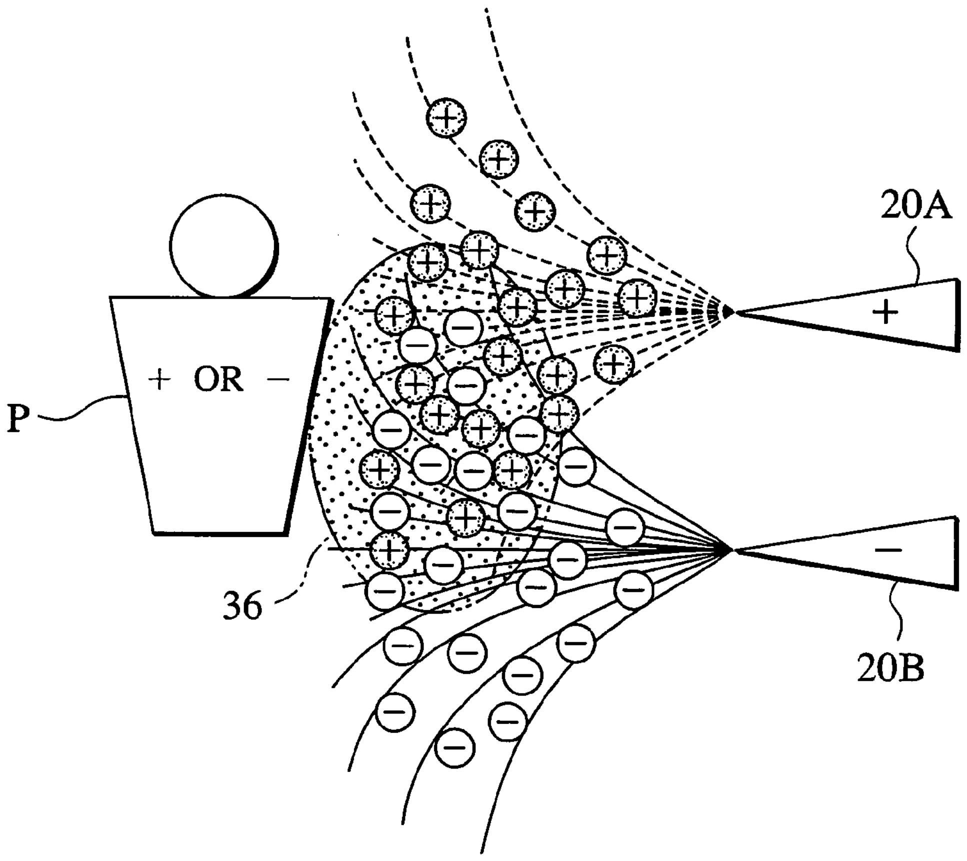
FIG. 6 is a schematic view illustrating a neutralization effect as a results of the ions emitted from the positive electrode and the negative electrode of the ion generator, in the first embodiment.

FIG. 6 is a schematic view illustrating a neutralization effect as a results of the ions emitted from the positive electrode and the negative electrode of one ion generator 20.

In particular, the ion generator 20 operates such that, as shown in FIG. 6, typically, the positive ions (+) are emitted from the positive electrode 20A and the negative ions (−) are emitted from the negative electrode 20B due to electrical action such as Coulomb force. And, if the occupant P is charged with the positive ions, the negative ions are oriented to the occupant, with the negative ions being coupled with the charges of positive ions. This results in neutralization of the occupant.

When this takes place, the positive ions emitted from the positive electrode 20A and the negative ions emitted from the negative electrode 20B mutually attract each other, resulting in formation of an area (area effective for neutralization) 36 in which the positive ions and the negative ions are present. If an object (occupant) to be neutralized is present in such an area 36, the object to be neutralized can be neutralized even in the presence of any of the positively or negatively charged statuses.

Further, the presence of the positive electrode 20A and the negative electrode 20B having the distal end portions oriented toward the occupant who gets on or gets off the vehicle enables the static electricity, charged to the object to be neutralized, to be efficiently neutralized.

Here, a distance between the positive electrode 20A and the negative electrode 20B should fall in a certain range.

Figure 7:
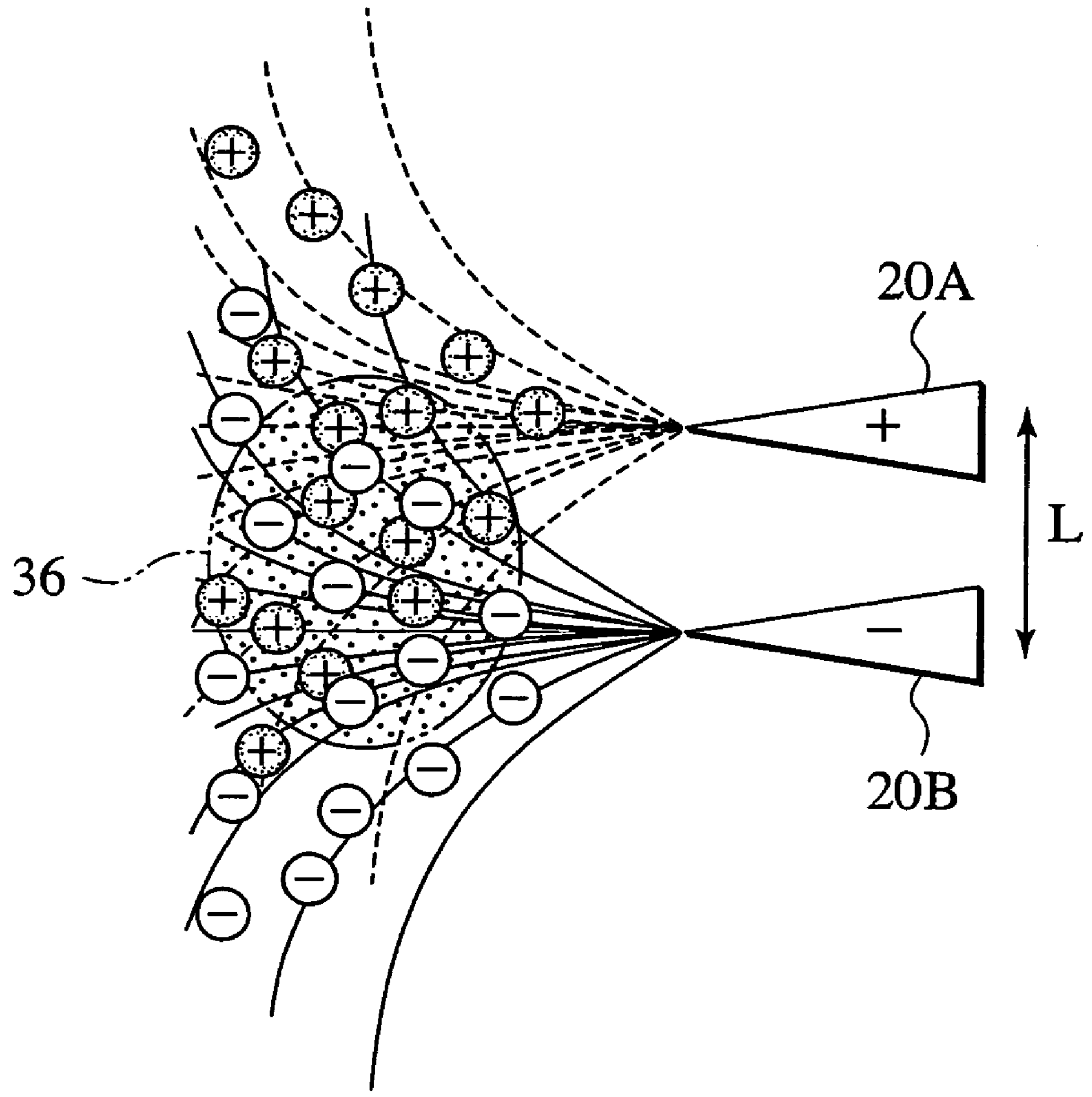
FIG. 7 is a schematic view illustrating a neutralization effect in a case resulting from a shortened distance between the positive electrode and the negative electrode of the ion generator, in the first embodiment.
Figure 8:
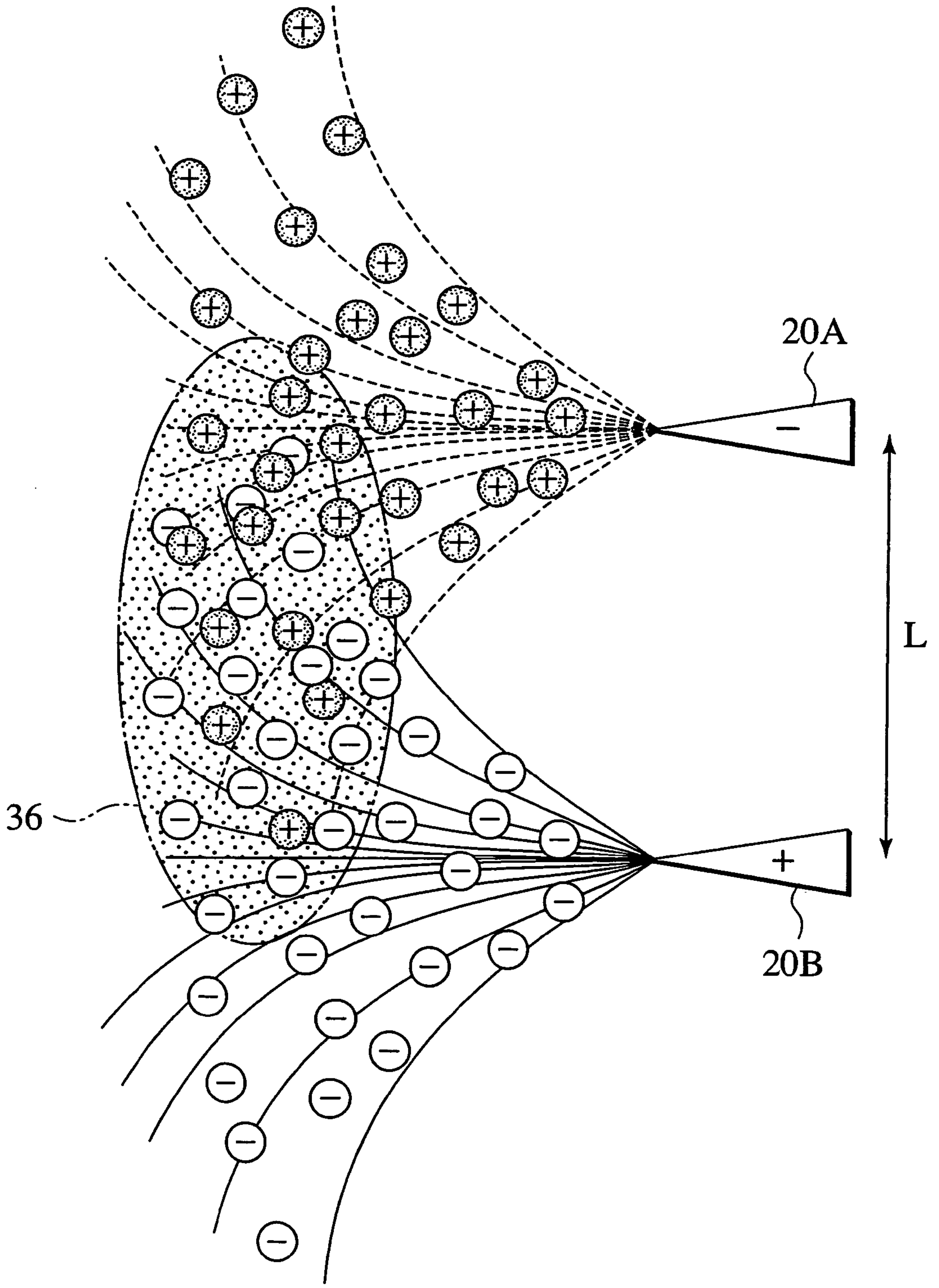
FIG. 8 is a schematic view illustrating a neutralization effect in a case resulting from a lengthened distance between the positive electrode and the negative electrode of the ion generator.

FIG. 7 is a schematic view illustrating a neutralization effect in a case resulting from a shortened distance between the positive electrode and the negative electrode of one ion generator, and FIG. 8 is a schematic view illustrating a neutralization effect in a case resulting from a lengthened distance between the positive electrode and the negative electrode.

As shown in FIG. 7, in the case where the distance between the positive electrode 20A and the negative electrode 20B is shortened, although an ion density to be effective for neutralization in the area 36 is intensified, the positive ions and the negative ions are liable to be coupled to one another and, hence, the range of the area 36 is narrowed.

On the contrary, as shown in FIG. 8, in the case where the distance between the positive electrode 20A and the negative electrode 20B is lengthened, although the area 36 has a widened range, the ion density in the area 36 is minimized and, hence, it becomes difficult to efficiently perform neutralization.

Thus, in view of the presence in which the distance L between the positive electrode 20A and the negative electrode 20B has a remarkable effect on a performance of the neutralization apparatus, the presently filed embodiment allows the distance L between the positive electrode 20A and the negative electrode 20B to be set to a value equal to or greater than 50 mm and equal to or less than 100 mm. That is to say, in the vehicle such as the passenger car, the presence of the distance L between the positive electrode 20A and the negative electrode 20B lying in the value less than 50 mm cause the area 36 effective for neutralization to have an excessively narrowed range and, in contrast, the presence of the distance L exceeding the value of 100 mm causes the ion density in such an area 36 to be in shortage, with both cases resulting to be of no practical use.

As set forth above, with the structure of the presently filed embodiment, since the ion generators 20 are disposed in at least one of the vicinity A of the room lamp 21, the vicinity B of the map lamp 23, the inside and upper C of the front pillar 24, the inside and upper D of the center pillar 25 and the vicinity E of the assist grip 26 such that the ion generator is placed in the ceiling, that is, the roof or the vicinity of the roof, permitting the ions emitted from the respective ion generators 20 to be adequately brought into impingement with a whole body, inclusive of a shoulder and arms, of the occupant for thereby enabling to efficiently neutralize the static electricity charged to the occupant.

Further, since the distal end portion of the positive electrode 20A and the distal end portion of the positive electrode 20B of such an ion generator 20 are oriented toward the occupant who gets on or gets off the vehicle, it is possible to efficiently neutralize the static electricity charged to the occupant.

Also, while the presently filed embodiment set forth above is arranged to detect the occurrence of the occupant getting off the vehicle using the door lock sensor 11, the external door knob sensor 12, the internal door knob sensor 13, the ignition sensor 14, the speed sensor 15, the pressure sensitive sensor 16 and the PKB sensor 17, any one of or a combination of these sensors enables the occurrence of the occupant getting off the vehicle to be detected.

Furthermore, it may be suffice for the ion generators 20 to be merely located in any one of or in combination of the vicinity A of the room lamp 21, the vicinity B of the map lamp 23, the inside and upper C of the front pillar 24, the inside and upper D of the center pillar 25 and the vicinity E of the assist grip 26.

Moreover, the ion generators 20 may be located in the ceiling, that is, the roof or the vicinity of the roof, at areas other than the vicinity A of the room lamp 21, the vicinity B of the map lamp 23, the inside and upper C of the front pillar 24, the inside and upper D of the center pillar 25 and the vicinity E of the assist grip 26.

Also, while the presently filed embodiment has been described in respect of the occupant getting off the vehicle, it is, of course, possible to apply the present invention to a case of the vehicle occupant getting on the vehicle if desired.

The entire content of a Patent Application No. TOKUGAN 2003-047463 with a filing date of Feb. 25, 2003 in Japan is hereby incorporated by reference.

Although the invention has been described above by reference to a certain embodiment of the invention, the invention is not limited to the embodiment described above. Modifications and variations of the embodiment described above will occur to those skilled in the art, in light of the teachings. The scope of the invention is defined with reference to the following claims.

What is claimed is:

1. A vehicular neutralization apparatus comprising:

an ion generator, disposed in a vicinity of a room lamp mounted to a central area of a roof inside the vehicle, configured to generate ions;

a controller configured to control the ion generator so as to cause the ions generated by the ion generator to be supplied toward the occupant for thereby neutralizing static electricity charged to the occupant; and a sensor detecting the occupant getting on and off the vehicle, wherein the controller controls the ion generator in response to the sensor detecting the occupant getting on and off the vehicle.

2. The vehicular neutralization apparatus according to claim 1, wherein the sensor includes at least one of a door lock sensor detecting a door lock button of the vehicle being actuated, an external door knob sensor detecting an external door knob of the vehicle being actuated, an internal door knob sensor detecting an internal door knob of the vehicle being actuated, an ignition sensor detecting an ignition of the vehicle being actuated, a speed sensor detecting a vehicle speed, a pressure sensitive sensor detecting whether the occupant rests on a seat, and a parking brake sensor detecting a parking brake of the vehicle being actuated.

3. The vehicular neutralization apparatus according to claim 2, wherein the ion generator is disposed in a position inside the vehicle in accordance with a motional posture of the occupant, occurring during getting on and off the vehicle.

4. The vehicular neutralization apparatus according to claim 1, wherein the ion generator is disposed in a position inside the vehicle in accordance with a motional posture of the occupant, occurring during getting on and off the vehicle.

5. A vehicular neutralization apparatus comprising:

an ion generator disposed in a vicinity of a room lamp mounted to a central area of a roof inside the vehicle to allow ions, generated by the ion generator, to be oriented toward an occupant, thereby neutralizing static electricity charged to the occupant, wherein the ion generator is provided with a positive electrode and a negative electrode supplying positive ions and negative ions.

6. The vehicular neutralization apparatus according to claim 5, wherein a distal end portion of the positive electrode and a distal end portion of the negative electrode of the ion generator are oriented toward the occupant getting on and off the vehicle.

7. The vehicular neutralization apparatus according to claim 6, wherein the ion generator is disposed in a position inside the vehicle in accordance with a motional posture of the occupant, occurring during getting on and off the vehicle.

8. The vehicular neutralization apparatus according to claim 5, wherein a distance between the positive electrode and the negative electrode of the ion generator lies in a value equal to or greater than 50 mm and equal to or less than 100 mm.

9. The vehicular neutralization apparatus according to claim 8, wherein the ion generator is disposed in a position inside the vehicle in accordance with a motional posture of the occupant, occurring during getting on and off the vehicle.

10. The vehicular neutralization apparatus according to claim 5, wherein the ion generator is disposed in a position inside the vehicle in accordance with a motional posture of the occupant, occurring during getting on and off the vehicle.

11. A vehicular neutralization apparatus comprising:

an ion generator disposed in a vicinity of a room lamp mounted to a central area of a roof inside the vehicle to allow ions, generated by the ion generator, to be oriented toward an occupant, thereby neutralizing static electricity charged to the occupant, wherein the ion generator is operative for a given time interval to emit the ions toward the occupant getting on and off the vehicle.

12. The vehicular neutralization apparatus according to claim 11, wherein the ion generator is disposed in a position inside the vehicle in accordance with a motional posture of the occupant, occurring during getting on and off the vehicle.

13. A vehicular neutralization apparatus comprising:

means, disposed in a vicinity of a room lamp mounted to a central area of a roof inside the vehicle, for generating ions and causing the generated ions to be oriented toward an occupant, thereby neutralizing static electricity charged to the occupant, wherein the means for generating ions is provided with a positive electrode and a negative electrode supplying positive ions and negative ions.

* * * * *